(12) United States Patent
Sihlbom et al.

(10) Patent No.: US 6,653,859 B2
(45) Date of Patent: Nov. 25, 2003

(54) HETEROGENEOUS INTEGRATED CIRCUIT WITH RECONFIGURABLE LOGIC CORES

(75) Inventors: Bjorn Sihlbom, Palo Alto, CA (US); Neal S. Stollon, Dallas, TX (US); Thomas McCaughey, Mountain View, CA (US)

(73) Assignee: LSI Logic Corporation, Milpitas, CA (US)

( * ) Notice: Subject to any disclaimer, the term of this patent is extended or adjusted under 35 U.S.C. 154(b) by 21 days.

(21) Appl. No.: 10/047,615

(22) Filed: Jan. 16, 2002

(65) Prior Publication Data

US 2002/0186042 A1 Dec. 12, 2002

Related U.S. Application Data

(60) Provisional application No. 60/297,586, filed on Jun. 11, 2001.

(51) Int. Cl.[7] .................... H03K 19/173; G06F 15/76
(52) U.S. Cl. ........................ 326/38; 326/101; 712/15
(58) Field of Search ................. 326/37–41, 44, 326/47, 101; 712/10, 15, 32, 35

(56) References Cited

U.S. PATENT DOCUMENTS

| | | | |
|---|---|---|---|
| 5,603,043 A | * | 2/1997 | Taylor et al. .................. 712/1 |
| 6,272,451 B1 | * | 8/2001 | Mason et al. .................. 703/13 |
| 6,538,470 B1 | * | 3/2003 | Langhammer et al. ........ 326/41 |

FOREIGN PATENT DOCUMENTS

KR    2002034692 A  *  5/2002  ............ H02M/7/00

* cited by examiner

*Primary Examiner*—James H Cho
(74) *Attorney, Agent, or Firm*—Conley Rose

(57) ABSTRACT

A heterogeneous integrated circuit having a digital signal processor and two programmable logic cores, PLCs. An AMBA AHB couples the cores and most other functional units on the IC. The PLCs are also coupled to the DSP through a separate DMA sharing unit to the DSP, and particularly to the DSP memory. The memory sharing arrangement provides a separate high-speed data transfer mechanism between the PLCs and the DSP. The AMBA AHB allows the DSP to control the PLC operations without interference with high-speed data transfers. The DSP may reconfigure one PLC using the AMBA AHB, while it is processing data with the other PLC.

20 Claims, 6 Drawing Sheets

HETEROGENEOUS INTEGRATED CIRCUIT WITH RECONFIGURABLE LOGIC CORES

CROSS-REFERENCE TO RELATED APPLICATIONS

The present application claims priority from provisional U.S. patent application Ser. No. 60/297,586, attorney docket number 01-333/PR, entitled "A Multi-Core Architecture For Flexible Broadband Processing", filed on Jun. 11, 2001, by the present inventors.

BACKGROUND OF THE INVENTION

The present invention relates to heterogeneous integrated circuits, and more particularly to integrated circuits having multiple programmable logic cores which are dynamically reconfigurable.

Wireless, imaging and broadband communications processing systems commonly use both signal and logical processing operations. Architectures suited to one type of processing are typically not suited or appropriate For the other. General-purpose architectures are limited both in flexibility and efficiency for digital signal processor, DSP, operations. DSP architectures, developed for arithmetic operations, are not optimal in functions with extensive bit level manipulations. Heterogeneous architectures, that is integrated circuits having both types of cores, provide one solution to this tradeoff.

For example, in a wireless communications system, the transmitted signals are normally encoded with error protection codes. When such signals are received, they must first be decoded to recover the transmitted information. Decoding is a bit level process. The decoded or recovered signal is processed by various arithmetic algorithms, e.g. for echo cancellation. Such arithmetic operations are best performed in DSPs.

The tradeoffs are further complicated by the fact that algorithms and standards in many emerging areas of signal processing, especially communications, are evolving. That is, new algorithms are being developed to meet new standards and it is desirable to update systems as soon as possible. In addition, it is desirable that both bit level and DSP processing operations be flexible so that different algorithms may be used for different signal streams which pass through the same system or for the same signal streams at different times. This diversity of processing and need for flexibility and reconfigurability of operation make fully programmable systems attractive to system designers.

In heterogeneous systems, the various cores usually do not all operate at the same clock frequency. DSPs usually operate at the highest clock speed, while bit level logic cores operate at a lower frequency. Cores exchanging data with a DSP through a general-purpose bus must operate at clock speeds limited by the bus. It would be desirable to optimize the data exchanges between a DSP core and other devices to make most efficient use of available bandwidth.

SUMMARY OF THE INVENTION

In accordance with the present invention, an integrated circuit includes a digital signal processor, at least two programmable logic cores, and a common interface bus system coupling the digital signal processor and programmable logic cores. With two programmable logic cores, both preprocessing and post-processing can be provided to accelerate system operation.

In one method of operation, one programmable logic core may run a process in conjunction with the digital signal processor, while the other is being reconfigured for running a different process. In a preferred embodiment, each programmable logic core includes two interfaces to the common interface bus system, one for coupling control signals from the digital signal processor and a second for reconfiguration. In a further preferred embodiment, the common interface bus includes two separate busses, one used for control functions and the other for configuration functions.

DETAILED DESCRIPTION OF EMBODIMENTS

Figure 1:
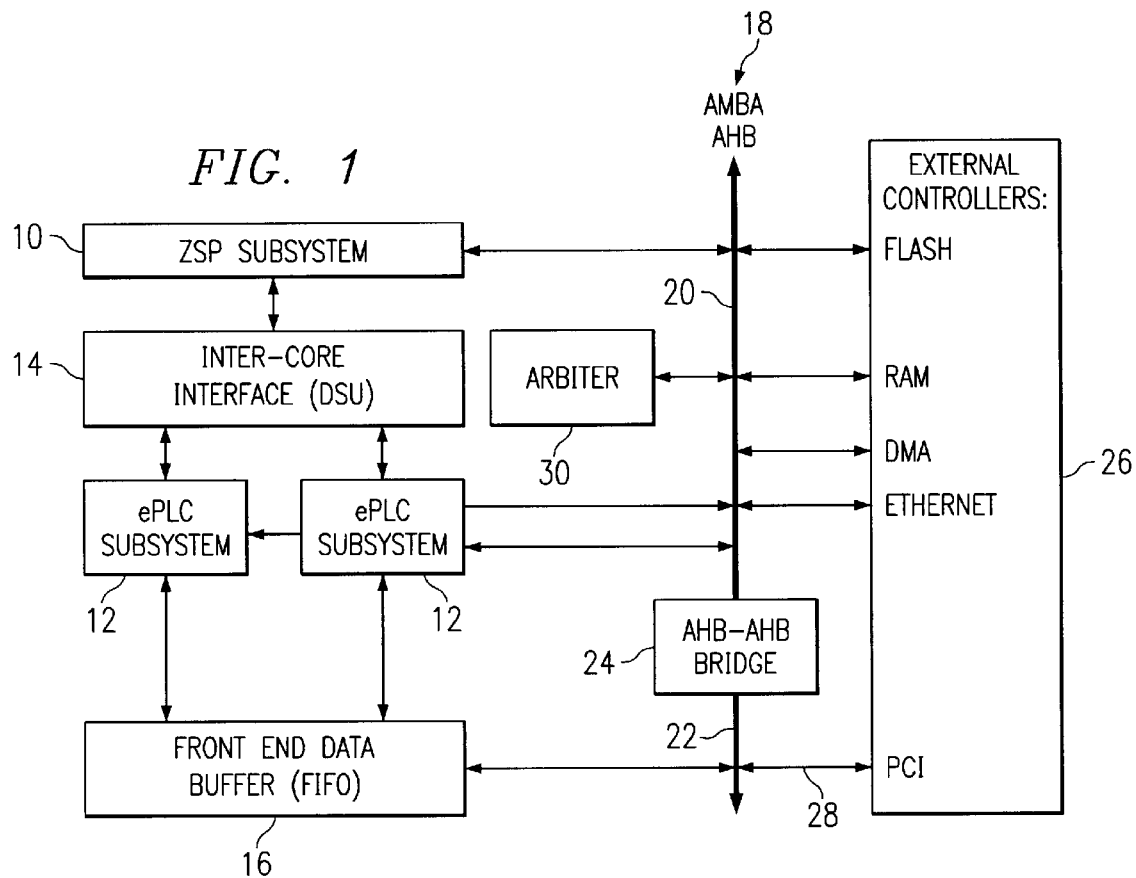
FIG. 1 is a general block diagram of a heterogeneous integrated circuit embodiment of the present invention.

With reference to FIG. 1, the basic structure of a heterogeneous integrated circuit embodiment of the present invention will be described. The system includes a digital signal processor subsystem, DSP, 10 and two programmable logic cores, PLCs, 12. In this embodiment, the DSP 10 is a ZSP400 core (ZSP) and its local memory subsystem. The ZSP400 is a 4-way superscalar, 16-bit DSP core developed by LSI Logic Corporation. The ZSP architecture is based on a 5-stage pipeline. The PLCs 12, also referred to as ePLCs, are RTL programmable logic core resources developed specifically for embedded applications. The PLC architecture is developed by Adaptive Silicon Inc. The PLCs provide a user configurable logic processing resource in the system of FIG. 1. Two PLCs are included in this embodiment, both to provide flexible configuration of programmable resources (for example to provide both pre and post processing relative to DSP 10) and to allow for reconfigurable operations, such as one PLC 10 being reprogrammed while the other is operating on data.

The FIG. 1 system also includes an inter-core interface, or direct memory access, DMA, sharing unit, DSU 14 connected between the DSP 10 and the PLCs 12. The DSU 14 provides high speed data transfers between the DSP 10 and the PLCs 14. The DSU 14 may be considered to be a dedicated high speed data bus.

A front end data buffer, FEB, 16 is provided for receiving data from external sources and coupling the data to PLCs 12 and through PLCs 12 and DSU 14 to the DSP 10. The FEB 16 operates on a first-in-first-out, FIFO, basis.

The system also includes an common interface bus system 18, in this embodiment an Advanced Microcontroller Bus Architecture (AMBA) Advanced High-performance Bus (AHB) bus system. The AMBA AHB system was developed by ARM Limited and has been accepted by many integrated circuit manufacturers as a standard on-chip common interface bus. As a result, many cores are designed with an AMBA AHB port, which simplifies interconnection of cores in an integrated circuit like the system shown in FIG. 1.

In this embodiment, the bus 18 is divided into two sections 20 and 22 coupled by a bridge 24. The section 20 couples on-chip cores and subsystems, e.g. DSP 10, PLCs 12 and DSU 14, and controllers 26 for external devices. The section 22 couples the FEB 16 to an external source of high speed signals or data such as a PCI bus 28. By splitting the bus into two parts 20 and 22, interference between the high bandwidth signals on section 22 and the slower control signals on section 20 is avoided. The bridge 24 provides a link which couples signals between the two bus sections. The bus 18 also includes an arbiter 30 for controlling bus operation.

Figure 2:
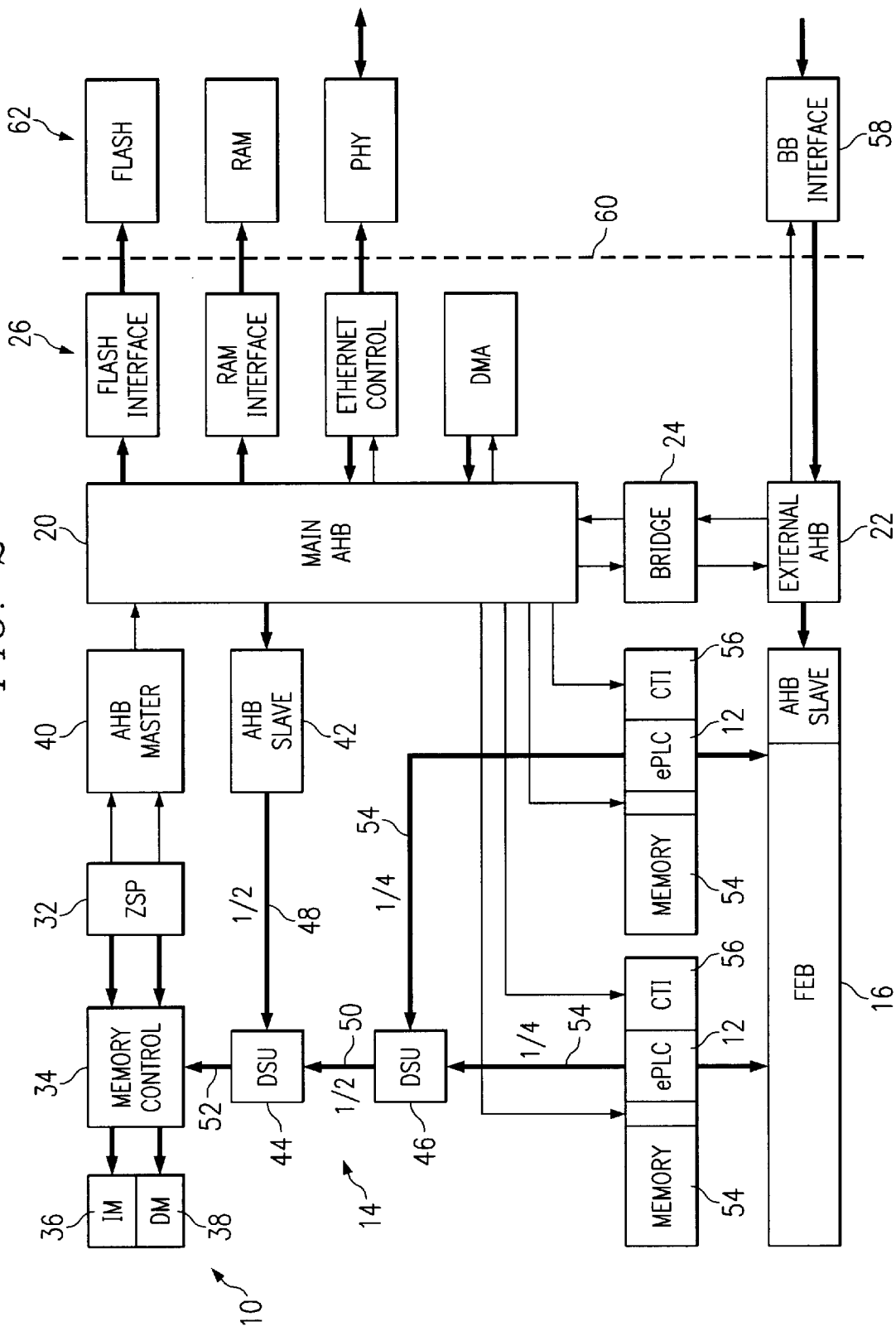
FIG. 2 is a more detailed block diagram of the system of FIG. 1.

With reference to FIG. 2, more details of the system of FIG. 1 are shown and will be described. The DSP subsystem 10 includes a processing core 32, a memory controller (MC) 34, an instruction memory (IM) 36 and a data memory (DM) 38. The DSP 10 system also includes an AHB master interface 40 which couples the DSP 32 to the AHB 20 as a master and an AHB slave interface 42 which couples the DSP 32 to the AHB 20 as a slave. The master interface 40 may be the system disclosed in U.S. patent application Ser. No. 09/847,849 filed Apr. 30, 2001 and assigned to the same assignee as this application, which application is hereby incorporated by reference for all purposes. The slave interface 42 may be the system disclosed in U.S. patent application Ser. No. 09/847,850 filed Apr. 30, 2001 and assigned to the same assignee as this application, which application is hereby incorporated by reference for all purposes.

In FIG. 2, the DSU 14 is shown to be made of two sections 44 and 46 connected in a series or cascade type of arrangement. The section 44 is coupled at 48 to the slave 42, is coupled at 50 to the section 46 and is coupled at 52 to a DMA port of memory controller 34. DSU section 46 is coupled at two inputs 54 to the two PLCs 12 and at 50 to the section 44. The sections 44, 46 time multiplex the connection of PLCs 12 and the slave 42 to the DMA input 52 of memory controller 34, as discussed in more detail below with reference to FIG. 6. As indicated in FIG. 2, the DSU section 46 connects each PLC 12 one-fourth of the time and the DSU section 44 connects the DSU section 46 and the slave bridge 42 one-half of the time. The effect of this connection allocation is that the full bandwidth available at the DMA input 52 is allocated to the three devices, i.e. PLCs 12 and AHB slave 42, accessing the data memory 38, as discussed below with reference to FIG. 8.

In FIG. 2, each of the PLCs 12 is shown to include working or scratchpad memories and control sections 56. Each of the memories 54 and control sections 56 has its own AHB connection to bus section 20. These bus connections allow the DSP to reconfigure and control the operation of PLCs 12. This AHB connection between DSP 32 and PLCs 12 is in addition to the connections through DSU 14, and avoids conflict or interference between the high bandwidth data path and the control path. Note however, that the path through AHB 20 can be used for coupling data, and may be useful in outputting the results of processing which normally have a lower bandwidth than the signals received from a broadband interface 58.

In FIG. 2, the external controllers 26 are coupled across dotted line 60 to their corresponding external devices 62. The dotted line 60 represents the boundary between devices implemented on an integrated circuit and the external devices 62.

With reference to FIG. 2, the overall operation of a signal processing system according to the present invention will be described. Broadband data is received through interface 58 and coupled to FEB 16. It is then coupled to one or both of the PLCs 12 for initial processing. For example, the broadband signals may be encoded video signals. The PLCs may be configured to decode the signals and recover the original transmitted signals. As the PLCs complete their processing task, they write the results into data memory 38. DSP 32 then reads the data from memory 38 and performs further arithmetic processing. If post processing is desired, the DSP 32 may write back to memory 38, from which a PLC 12 can read for the post processing step. When processing is completed, the device performing the last step, i.e. either the DSP or the PLC, couples the results to a desired external device, for example a video screen.

Figure 3:
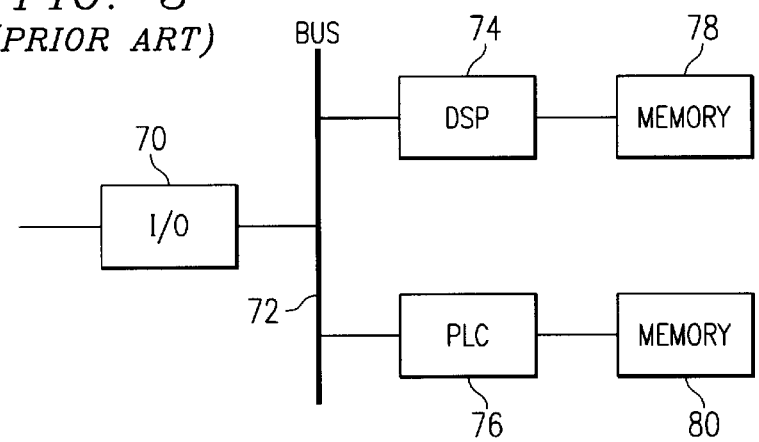
FIG. 3 is a block diagram of a prior art system.

An advantage of the present invention can be seen by consideration of a prior art architecture shown in FIG. 3 which may be used for similar types of signal processing. In FIG. 3, an input output device 70 is shown coupled by a common interface bus 72, e.g. an AMBA AHB, to a DSP 74 and a PLC 76. DSP 74 has closely coupled memory 78. PLC 76 has its own memory 80. In this architecture, data received from I/O 70 is first received by PLC 76 and written into memory 80 for preprocessing. As preprocessing is completed, the results are stored in memory 80. When DSP 74 is ready for the data, it requests the data from PLC 76, which must read the data from memory 80 and transfer it to DSP 74, which must then write the data into memory 78. Both PLC 76 and DSP 74 must be involved in the separate reading and writing steps just to transfer the data to the DSP after preprocessing is completed. Once the data is in memory 78, the DSP can perform its processing steps. The present invention avoids the extra reading and writing steps used in the prior art systems for transferring data. In the present invention, a single memory unit is shared by both the DSP and the PLCs, so that there is no need for a separate data transfer step. The present invention also avoids using a common interface bus on an integrated circuit for high bandwidth data transfers.

Figure 4:
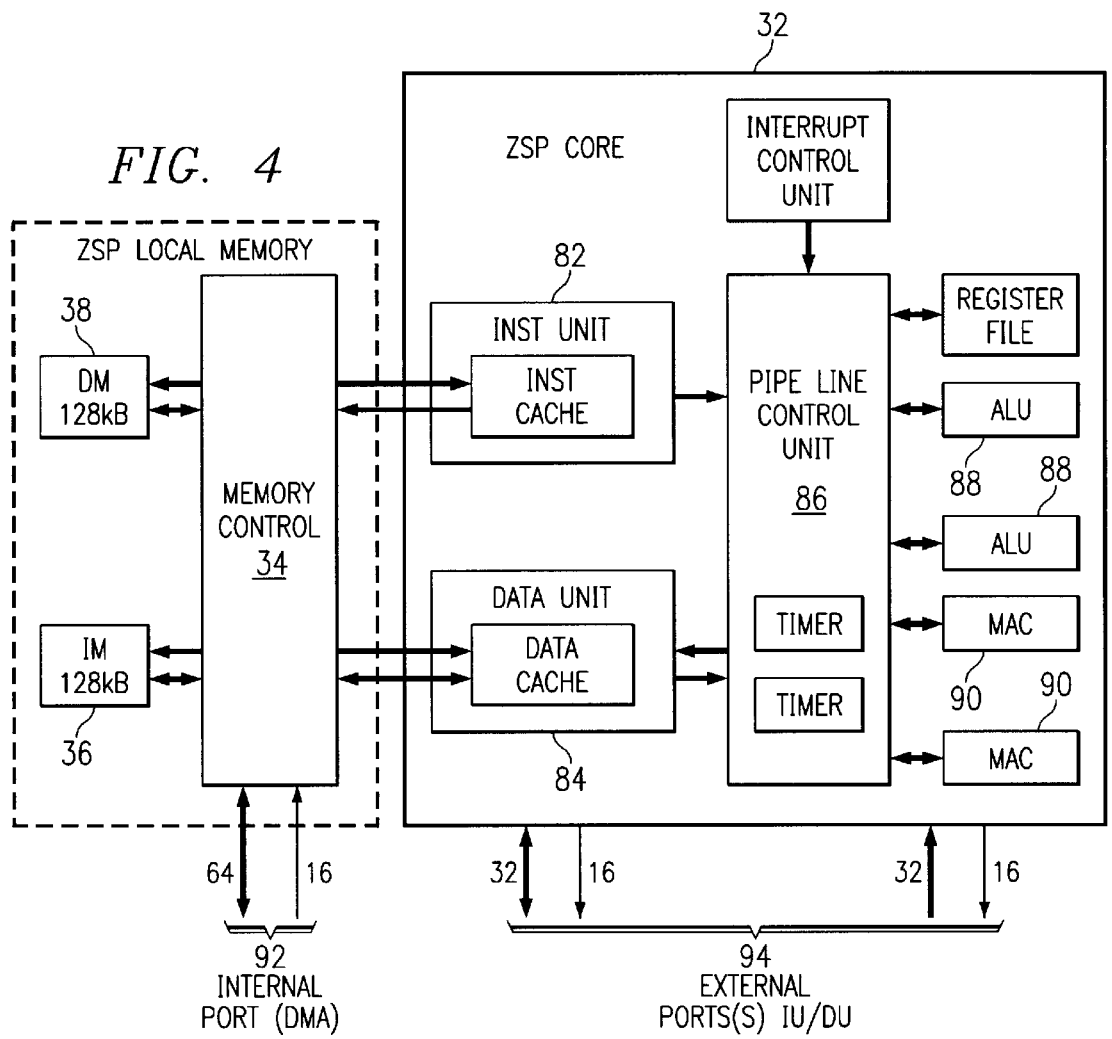
FIG. 4 is a block diagram of the DSP of FIGS. 1 and 2.

With reference to FIG. 4, more details of the DSP 10 of FIGS. 1 and 2 will be described. Parts corresponding to parts shown in FIGS. 1 and 2 are given the same reference numbers in FIG. 4, e.g. memory controller 34, instruction memory 36 and data memory 38. The DSP core 32 includes all of the components within solid line box 32 of FIG. 4. These include an instruction unit 82, a data unit 84, a pipeline controller unit (PCU) 86, two arithmetic logic units (ALUs) 88 and two multiply and accumulate units (MACs) 90.

Instruction and data units 82, 84 manage the memory interface and implement pre-fetching of instruction and data for use by the pipeline controller unit 86 and execution units 88, 90. The instruction unit 82 does instruction pre-fetching and dispatching via a direct-mapped instruction cache in order to present four instructions per cycle to the pipeline control unit 86. The data unit 84 does data pre-fetching, and load/store arbitration and buffering, via a fully associative data cache. Caching is used in the IU 82 and DU 84 to keep the execution units 88, 90 fed with data to maximize the number of instructions executed per cycle.

The pipeline controller unit 86 groups instructions and resolves data and resource dependencies for parallel execution. The PCU 86 schedules instructions for execution by four functional units, i.e. MACs 90 and ALUs 88, and synchronizes pipeline operations, including operand bypass and interrupt requests.

The MACs 90 and ALUs 88 can work independently and concurrently to perform up to four 16-bit by 16-bit operations per cycle. The MAC 90 or ALU 88 resources can be grouped for 32-bit by 32-bit operations or dual 16 bit operations.

The DSP core 32 implements two interface ports for memory and peripherals: an internal port interface 92 for close coupled, single cycle instruction memory 36 and data memory 38; and an external port for IU 82 and DU 84 alternative access to external memory and peripherals. The internal and external ports 92, 94 both contain instruction and data interfaces that support either single ported or dual ported memories. The internal port 92 is coupled to DSU section 44 at its port 52 as illustrated in FIG. 2. The external ports 94 are coupled to AHB master bridge 40 of FIG. 2.

The internal port 92 allows closely coupled "local" memory interfacing and is intended for use with synchronous on-chip memory. The DSP core 32 can simultaneously access internal instruction memory 36 and data memory 38 every cycle in order to provide data and instructions in superscalar operations. Each of the data and program memory ports 92, 94 support 64-bit memory reads and 32-bit writes. The internal port I/O is non-stallable to facilitate ZSP memory throughput. By using dual ported memory and a memory interface controller 34 that allows multiplexing and segmentation of memory ports, a low overhead Direct Memory Access (DMA) interface to external on-chip logic is implemented. These DMA interfaces allow shared access by the DSP and other logic to local DSP subsystem memory and provide for direct high bandwidth (up to 64 bit) access of external data into the DSP core or conversely direct export of DSP data to external on-chip logic.

The external port 94 interfaces the DSP to external memory and peripherals and provides 16 bit input and 32 bit output data bussing to the core IU 82 and DU 84. The external port 94 interface, unlike the Internal Port interface is fully stallable. The external port is interfaced to the AMBA AHB 20 (FIG. 2) as a bus master, allowing control of all other blocks.

Figure 5:
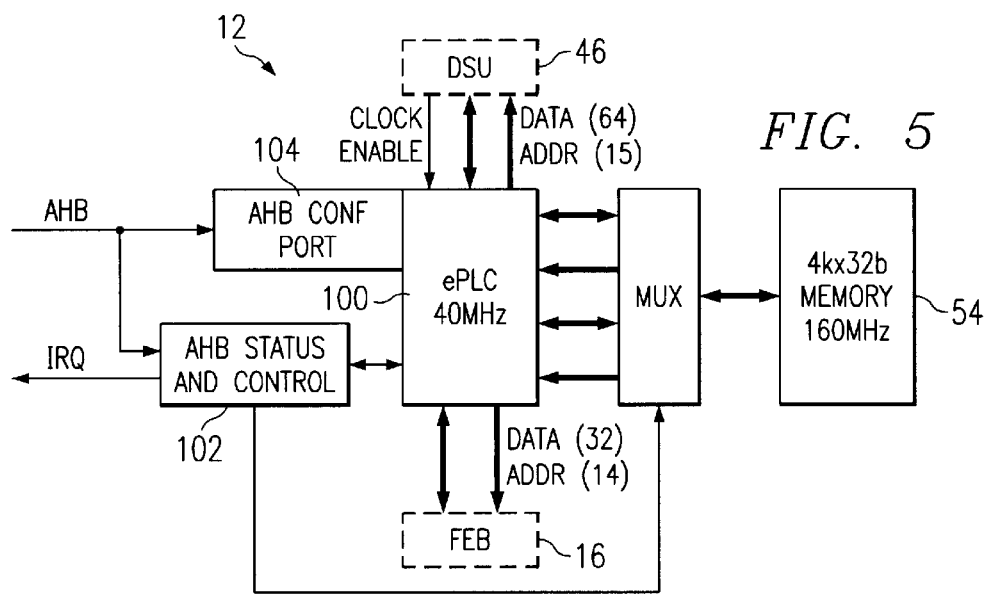
FIG. 5 is a block diagram of a PLC of FIGS. 1 and 2.

With reference to FIG. 5, more details of the PLCs 12 of FIGS. 1 and 2 are provided and will be described. Each PLC 12 includes a multi-scale array (MSA) 100, an application circuit interface (ACI) or status and control port 102, and a PLC adapter or configuration port 104.

The PLCs 12 are intended as loosely coupled co-processors for algorithm acceleration. The PLC 12 architecture is an RTL programmable logic core resource developed specifically for embedded applications. The PLC architecture in this embodiment was developed by Adaptive Silicon Inc. The PLC contains user configurable logic processing resource.

The MSA 100 contains user programmable portions of the PLC and consists of an array of configurable ALU (CALU) cells and their local and hierarchical interconnect and routing resources. The MSA is implemented as a hard-macro.

The application circuit interface (ACI) 102 provides the signal interface between the MSA 100 and the application circuitry and is contained in the same hard-macro as the MSA. In this embodiment, ACIs are used for both DSU and Data buffer interfaces.

The PLC adapter 104 initiates and loads the PLC 12 configuration data and interfaces to test circuitry, clock and reset control through a configuration test interface. PLC adapters integrate to an AMBA AHB slave interface. This allows the PLC programming to be handled over the on-chip AHB from flash or other external memory.

The PLC 12 contains two AHB interfaces. One, integrated with the PLC adapter 104, is dedicated to PLC programming. The other, integrated with the ACI 102, provides for general-purpose communication over the AHB to peripherals and DSP core 32 as needed.

Supporting sufficient on-chip bandwidth is a critical parameter in DSP/programmable logic architectures. The present embodiment uses dual approaches for integration between cores. Both DSP 10 and PLC 12 cores interface to the AMBA AHB bus 18, along with every other significant on-chip logic block. The AHB bus 18 structure contains two AHB bus segments 20, 22 (main and external) divided by the bi-directional AHB—AHB bridge 24. The bus 18 is divided by the bridge to separate high bandwidth on the external segment 22 from low latency control traffic on the main segment 20. Bridging these two types of traffic ensures they will not interfere with each other. The main segment 20 contains 3 AHB masters (DSP, DMA and Ethernet) plus the bridge 24 which can act as master for inter-segment communications. Control and maintenance of logic, including PLC sub-systems 12 is done through the main AHB.

All peripheral communication is handled through the AHB buses, with the external AHB dedicated for high bandwidth interface to system front-end, e.g. PCI, data transfers to a front-end buffer 16 that directly interfaces to the PLC blocks 12.

AMBA does not, however, support levels of processor and accelerator integration desired in broadband processing. To address this, the present invention uses a dedicated DMA/sharing unit (DSU) interface 14 (FIGS. 1 and 2) for multi-word access of DSP internal memory data by both the DSP and PLC blocks. It also provides for direct data transfer between DSP internal ports 92 and PLCs 12. This method separates high bandwidth data transfers and low latency control communication.

Figure 6:
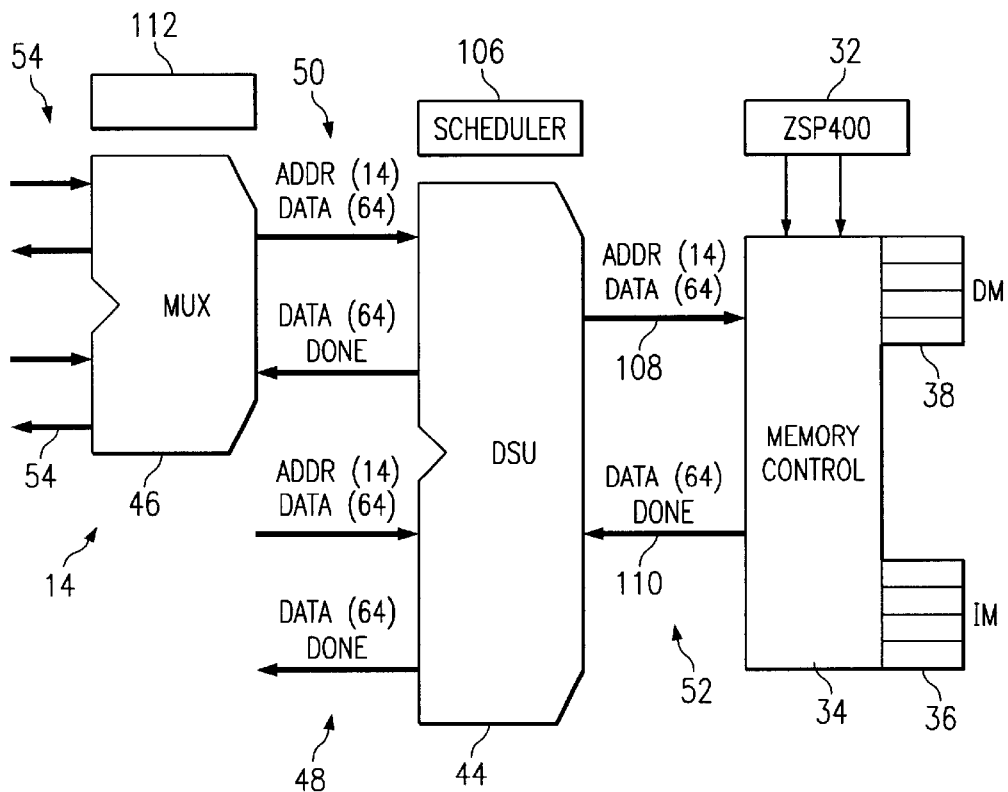
FIG. 6 is a block diagram of a DMA port share unit of FIGS. 1 and 2.

FIG. 6 provides more details of the DSU 14 and other portions of FIGS. 1 and 2. Corresponding parts have the same reference numbers. For example, the DSU 14 of FIG. 1 is shown in FIG. 2 to include two cascaded sections 44, 46 which are essentially identical. As shown in FIG. 6, the DSU 44 also includes a scheduler 106 that shares the DMA port between PLC accelerator sub-systems 12 and AHB slave interface 42, and also handles stalling of data from the PLC blocks when the DSP 32 and PLC subsystem 12 actively access the same memory bank in internal memory 36, 38. Stalls won't occur when separate memory banks are accessed, which is the preferred method.

In FIG. 6, the structure of the ports 48, 50 and 52 of DSU section 44 are shown in more detail. Port 52 includes an address and data bus 108, also labeled ADDR (14)/DATA (64), and a control bus 110, also labeled DATA (64)/DONE. Bus 108 couples an address, a read or write flag and, for a write, data to be written at that address to the memory controller 34. If the request is completed, the control bus 110 provides a DONE=1 on the next clock cycle. If the request in not completed, e.g. because DSP 32 was accessing the same memory bank on that clock cycle, the control bus will indicate DONE=0 and the requesting device must stall and try the operation again.

The DSU 44 is essentially a multiplexor having two ports 48, 50 which are alternately coupled to the port 52. The selection is made by scheduler 106. In this embodiment, the scheduler 106 simply switches between ports 48 and 50 on alternate clock cycles in synchronization with the clock of DSP 32. That is, each of the ports 48 and 50 can operate at half of the bandwidth of DSP 32. The ports 48 and 50 have the same address/data bus and control bus configuration as port 52, since they are coupled through DSU 44 on a one-to-one basis.

The DSU 46 may be identical to DSU 44 and operates in essentially the same way. It includes a scheduler 112 like scheduler 106. The scheduler alternately connects the two ports 54 to the port 50 on a 50/50 duty cycle. Ports 54 have the same address/data bus and control bus configuration as port 50, since they are coupled through DSU 46 on a one-to-one basis. The only operational difference is the clock frequency used by scheduler 112. It operates at half the clock frequency of DSP 32, since the port 50 is coupled to port 52 only half the time. As a result, the ports 54 couple each of the PLCs 12 through DSU section 46 and DSU section 44 to the memory controller 34 one-fourth of the time. Note that the data bus width is 64 bits, which can include four 16-bit bytes or two 32-bit bytes, effectively increasing the bandwidth of transfers between PLCs 12 and the memory controller 34.

Figure 7:
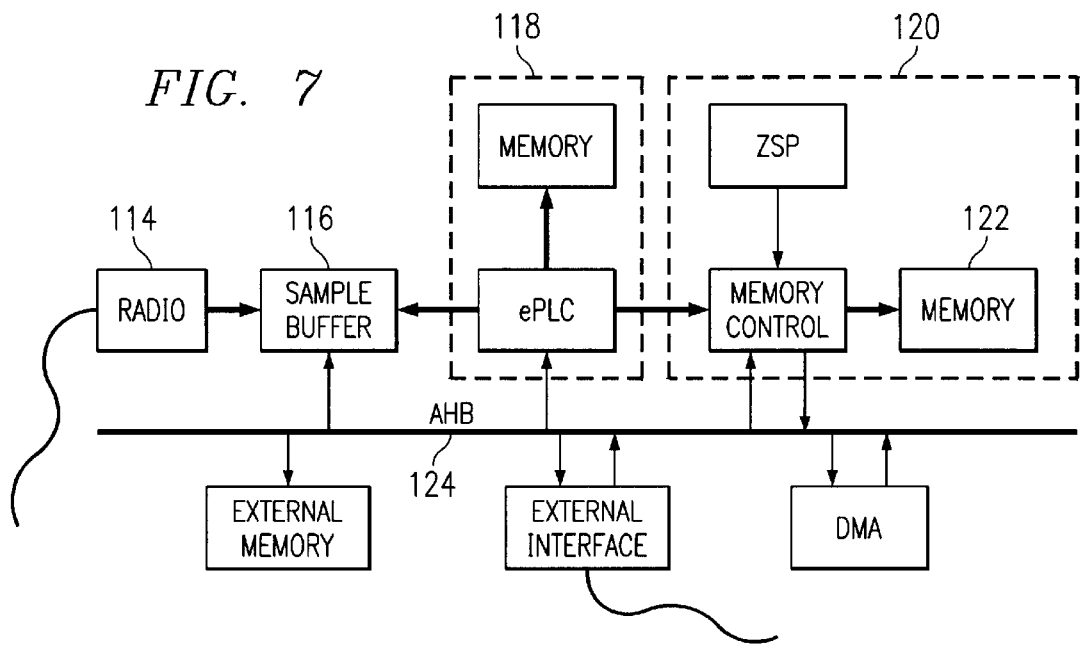
FIG. 7 is a block diagram illustrating intercommunication within an embodiment of the present invention.

In FIG. 7, broadband processing signal flow is illustrated. Data is imported and exported in a batch or streaming mode from a high-throughput buffered interface 114, e.g. a radio receiver. A data buffer 116 simplifies the caching of bursting data on chip. One or more PLC blocks 118 are used to implement a range of pre-processing and data reduction operations. Data is then presented to the DSP subsystem 120, either through shared memory or directly from the DSU for DSP operation. The DSP output data can then be either exported off chip or to the PLC 118 for further post processing (one reason for incorporating 2 PLC blocks) via the shared DSP internal memory 122. While the DSU does not provide a communication channel between the PLC sub systems 118, the PLC systems can communicate via the shared DSP internal memory 122 or FEB 116. It is also possible to move data between PLC systems via DSP controlled AHB 124 traffic.

The amount of data available and used in different processing steps (pre-DSP and post-processing) typically is reduced with each step. As a result, interfaces required for export of processed data (e.g. Ethernet) can have significantly lower bandwidth than those needed during import stages (e.g. PCI).

Figure 8:
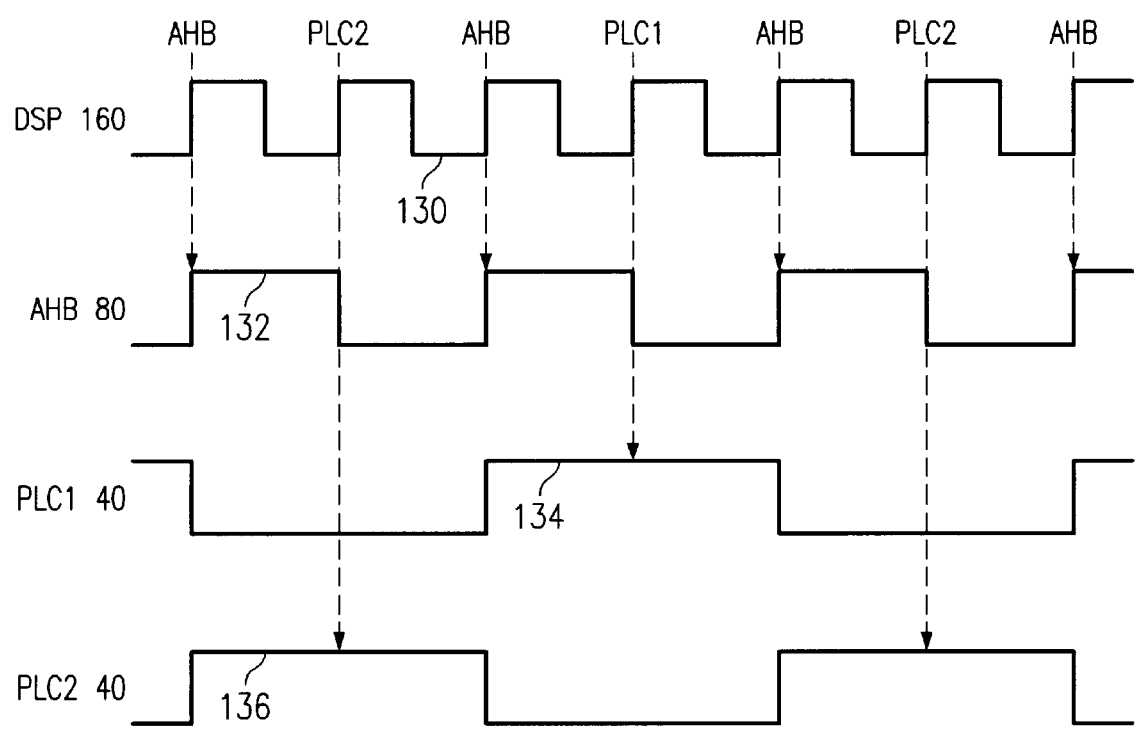
FIG. 8 is a timing diagram illustrating time-sharing of the DMA port in one embodiment of the present invention.

FIG. 8 is a timing diagram illustrating time-sharing of the DSP 32 internal port 92 (FIG. 4). This timing arrangement provides the ¼ and ½ timing arrangement shown in FIG. 2 and discussed with reference to FIG. 6. In this embodiment the DSP 10 system operates at 160 MHz as illustrated by the waveform 130. The entire system is isosynchronous, i.e. all components operate at the main clock frequency or an integral division thereof. The AHB 20 operates at 80 MHz, as illustrated by waveform 132. The two PLCs 12 operate at 40 MHz as illustrated by waveforms 134 for PLC1, and 136 for PLC2. The waveforms 134 and 136 are out of phase by 180 degrees, i.e. one is the inverse of the other.

The memory controller 34 of DSP 10 may perform memory operations at each positive transition of waveform 130. The total available bandwidth for memory operations at the internal DMA port 92 (FIG. 4) is therefore 160 MHz. The DSU 14 (FIG. 2) allocates this bandwidth to the two PLCs 12 and to the AHB 20 (through AHB slave 42) so that each device may perform memory operations at its maximum operating frequency. The allocation is indicated at the top of FIG. 8 where each positive transition of waveform 130 is labeled as AHB, PLC1 or PLC2. Each label has a dashed line extending down to the waveform for the indicated device and indicating when the device is connected to memory controller 34 for a memory operation. Since AHB 20 operates at 80 MHz, it is allocated ½ of the bandwidth and every other positive transition of waveform 130 is labeled AHB. These transitions also correspond to the positive transitions of waveform 132, which are the times at which the AHB 20 can perform memory operations. The AHB 20 therefore has access for memory operations at 80 MHz.

The remaining positive transitions of waveform 130 are alternately labeled PLC1 and PLC2. As shown in FIG. 8, these transitions correspond to the positive clock cycles of waveforms 134 and 136, which are the times at which the PLC1 and PLC2 can perform memory operations. Each PLC12 therefore has access for memory operations at 40 MHz.

This bandwidth allocation system includes the providing of clock subfrequencies to the PLCs 12 and the AHB 20 in synchronization with the system clock for DSP 10, i.e. providing isosynchronous clock signals. It also includes providing the clock signals to the PLCs with 180-degree phase shift, or with one inverted relative to the other. The desired allocation is achieved by use of the simple schedulers 106, 112 (FIG. 6) which alternate connection of the ports of DSU sections 44 and 46 respectively. For the clock frequencies shown in FIG. 8, scheduler 106 operates at 160 MHz and scheduler 112 operates at 80 MHz.

In the embodiment described with reference to FIG. 8, the system may use two PLCs 12 at the same time. They may be operated in parallel to perform a single accelerator function more quickly or more efficiently, or one may be used for a preprocessing operation while the other is used for a post-processing operation.

The system as illustrated in FIGS. 2 and 6 may be operated in other modes. If only one accelerator function, e.g. decoding of received signals, is required and a single PLC can handle the load, the other PLC may be reconfigured while the first is processing data. As discussed above with reference to FIGS. 2 and 5, each PLC 12 has two common interface bus ports. One of these is a configuration port 104 through which the DSP 10 can load configuration files into the PLC. The DSP 10 can load configuration files, e.g. from flash memory, to one PLC while the other is processing data. This allows the system to dynamically adjust to new conditions or new types of input signals which require different preprocessing. In the decoding example, the system may need to process signals which have been encoded with different codes and can reconfigure a PLC in preparation for the change. This allows seamless processing of different signal streams.

This mode of operation may be referred to as ping-pong processing, because the system may use a first PLC for a period of time and then the system may use a second when the processing requirements change. When using the second, the first may be reconfigured for yet another process or algorithm and the system can switch back to the first when requirements change again. In this mode of operation, the DSU 46 has a new mode of operation. In the above described embodiments, the scheduler 112 toggled the connection of ports 54 at one half the clock speed of DSP 10. In the ping-pong mode of operation, the scheduler 112 switches the connections only upon command of the DSP 10 as the change to a newly reconfigured process is required.

Figure 9:
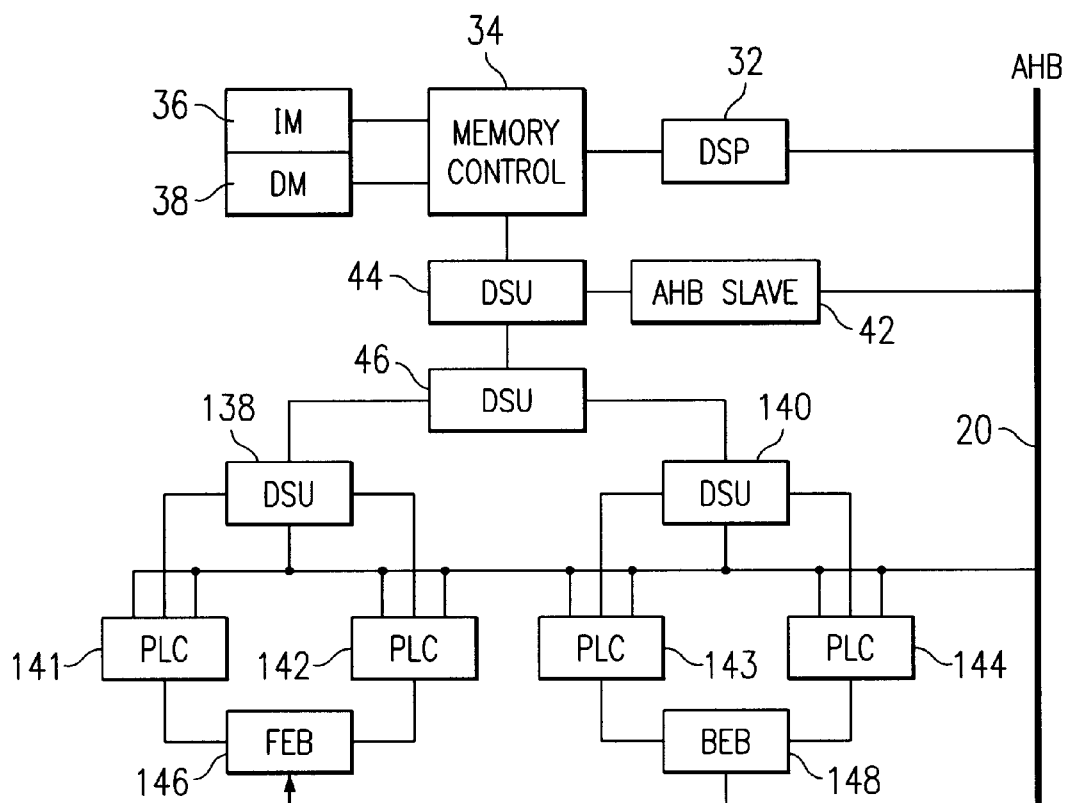
FIG. 9 is a block diagram of an embodiment of the present invention with four PLCs, illustrating ping-pong operation.

FIG. 9 illustrates another embodiment in which four PLCs are used so that two accelerator functions may be used at the same time and the system can operate in ping-pong mode, i.e. dynamically change to other accelerator functions. In FIG. 9, the DSP 32, MC 34, IM 36, DM 38, AHB slave 42 and DSUs 44, 46 may be the same elements as shown in FIG. 2 with the same reference numbers. In this embodiment two additional DSUs or multiplexors 138 and 140 are used to couple four PLCs 141–144 to DSU 46. A front end buffer, FEB, 146 is used to couple incoming signals to PLCs 141 and 142. A back end buffer, BEB, 148 is used to couple signals from PLCs 143, 144 to an external device. DSUs 138, 140, and PLCs 141–144 are coupled to the common interface bus 20 for receiving control and configuration signals from DSP 32.

The FIG. 9 embodiment is used in systems which require both preprocessing and postprocessing and which need to adapt to changing pre and post processing requirements in the ping-pong arrangement described above. PLC 141 may be configured for a preprocessing function and PLC 143 may be configured for a corresponding postprocessing function. DSP 32 may then signal DSUs 138 and 140 to couple PLCs 141 and 143 to DSU 46. The system may then process signals as described above with reference to FIG. 2. While the system is operating in this first mode, the DSP 32 may reconfigure PLCs 142 and 144 through bus 20 for a second set of pre and post processing functions. When a new signal stream is received, the DSP 32 may signal DSUs138 and 140 to connect PLCs 142 and 144 to DSU 46 and the system may proceed with the new processing functions without any down time. The DSP 32 may then reconfigure PLCs 141 and 143 through bus 20 in preparation for yet another signal stream.

The FIG. 9 embodiment allows dynamic reconfiguration and processing with essentially no down time or stalls, so long as the reconfiguration time is less than the processing time. If processing segments are shorter than reconfiguration time, a third pair of PLCs may be used.

The structure of FIG. 9 will also support modes of operation in which all four PLCs 141–144 are in use at the same time. For example, if the bandwidth of signals received at FEB 146 exceeds the capacity of PLC 141, it may be possible for PLCs 141 and 142 to "share" the load. In that case, the DSU 138 can be operated isosynchronously to alternately connect PLCs 141 and 142 to DSU 46. In similar fashion, PLCs 143 and 144 may be operated in parallel and alternately coupled by DSU 140 to DSU 46. In this way, the bandwidth allocated to the PLCs can be shared between the four PLCs 141–144.

In FIGS. 1, 2, 7 and 9 the common interface bus system 18 is illustrated as a single bus comprising two serially connected sections 20 and 22. As illustrated in FIGS. 2, 5 and 9, each of the PLCs has two AHB interfaces, one for control functions and one for reconfiguration. In high bandwidth systems, the DSP may be using the bus system 18 almost full time to control operation of PLCs. As noted above there are other bus masters including a DMA connected to the bus 18. It will normally be efficient for reconfiguration to be handled by the DMA since the reconfiguration process consists mostly of downloading new program files. But since the DSP normally has first priority on bus operations, it can slow down the reconfiguration process if the DSP and a DMA share a single AHB.

Figure 10:
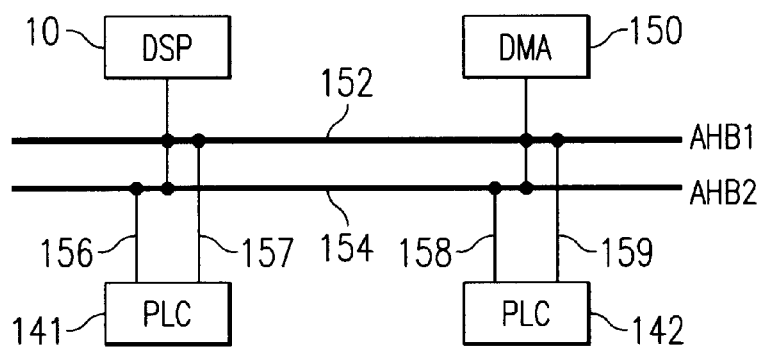
FIG. 10 is a block diagram of a portion of an embodiment of the present invention having separate common interface busses for control and reconfiguration functions.

FIG. 10 illustrates an embodiment which allows reconfiguration to proceed without conflict with DSP control signals. In FIG. 10, the bus system 18 of FIG. 1 is shown to include two separate busses 152 and 154, also labeled AHB1 and AHB2. Two of the PLCs 141, 142 of FIG. 9 are each shown having connections to both busses 152 and 154. PLC 141 has a bus connection 156 to bus 152 and connection 157 to bus 154. PLC 142 has connection 158 to bus 154 and connection 159 to bus 152. Two bus masters, DSP 10 and direct memory access device, DMA, 150 have ports to both busses 152 and 154. The masters can connect to either bus by memory mapping, and thus can be selectively connected to either bus 152 or 154. In this embodiment bus 152 is used for supporting configuration and PLC connections 157 and 159 are the configuration ports of PLCs 141, 142 respectively. Bus 154 is used for supporting control and status signals and PLC connections 156 and 158 are the control and status ports of PLCs 141, 142 respectively.

When PLC 141 is supporting DSP 10, the DSP 10 is coupled through the control and status bus 154 to the control and status port 156 of PLC 141. At the same time, the DMA 150 is coupled through the reconfiguration bus 152 to the configuration port 159 of PLC 142. The control and status signals from DSP 10 to PLC 141 therefore do not conflict with the reconfiguration of PLC 142.

When the DSP 10 needs to switch operating modes by using the reconfigured PLC 142, the DSP 10 and DMA 150 switch their connections to the busses 152, 154. When that switch occurs, the DSP 10 is connected to the control and status port 158 of PLC 142 and the DMA 150 is connected to the reconfiguration port 157 of PLC 141. The DMA 150 may then reconfigure PLC 141 while DSP 10 uses PLC 142 for coprocessing of signals.

Each of the common interface busses shown in FIGS. 1, 2, 7 and 9 may include two separate busses as shown in FIG. 10. Each of the illustrated PLCs will have its two bus ports connected to the two busses in the pattern shown in FIG. 10.

A number of variations to the present invention may be made. For example, frequencies other than those used in this embodiment may be used. More than two pairs of PLCs may be used if desired. For example, eight PLCs may be used to allow one set of four to perform pre and post processing while a second set of four is being reconfigured. In that case, additional DSU sections may be used to multiplex between the two sets so that the set doing actual processing work is connected to the DSP memory 38. The set being reconfigured does not need that connection, since reconfiguring is done through the AHB bus 20.

As noted above with reference to FIG. 6, the DSP 10 always has priority for accesses to IM 36 and DM 38. Where a conflict occurs, the memory controller 34 returns a control signal, DONE=0, which stalls the requesting device which must then retry on its next allocated access time. MC 34 can access both IM 36 and DM 38 during the same clock cycle, and can likewise access multiple banks in each of IM 36 and DM 38 during the same clock cycle. A conflict will occur only if the DSP 10 is accessing the same bank in the same memory as a PLC or the AHB device is trying to access. That is, both the DSP 10 and a PLC 12 may access IM 36 or DM 38 at the same time if they are accessing different banks.

While the present invention has been illustrated and described in terms of particular apparatus and methods of use, it is apparent that equivalent parts may be substituted of those shown and other changes can be made within the scope of the present invention as defined by the appended claims.

What we claim as our invention is:

1. An integrated circuit comprising:
   a common interface bus system,
   a digital signal processor coupled to said common interface bus system,
   a first programmable logic core having a configuration interface coupled to said common interface bus system and having a control interface coupled to said common interface bus system, and a second programmable logic core having a configuration interface coupled to said common interface bus system and having a control interface coupled to said common interface bus system, whereby said digital signal processor may control operation of one of said first and second programmable logic cores while the other of said first and second programmable logic cores is being reconfigured.

2. The integrated circuit of claim 1 further comprising:

a direct memory access device adapted for configuring programmable logic cores coupled to said common interface bus system, whereby said digital signal processor may control operation of one of said first and second programmable logic cores while said direct memory access device configures the other of said first and second programmable logic cores.

3. The integrated circuit of claim 1 wherein:

said common interface bus system comprises a control bus and a configuration bus, said digital signal processor is coupled to both said control bus and said configuration bus, said first programmable logic core configuration interface is coupled to said configuration bus, said first programmable logic core control interface is coupled to said control bus, said second programmable logic core configuration interface is coupled to said configuration bus, and said second programmable logic core control interface is coupled to said control bus.

4. The integrated circuit of claim 3, further comprising:

a direct memory access device adapted for configuring programmable logic cores coupled to both said control bus and said configuration bus, whereby said digital signal processor may control operation of one of said first and second programmable logic cores while said direct memory access device configures the other of said first and second programmable logic cores.

5. The integrated circuit of claim 1 wherein said common interface bus system is an advanced microcontroller bus architecture advanced high-performance bus system.

6. The integrated circuit of claim 1 further comprising:

a memory coupled to said digital signal processor and to said first programmable logic core and said second programmable logic core, whereby said digital signal processor may exchange data with said programmable logic cores independently of said common interface bus system.

7. The integrated circuit of claim 6 further comprising a multiplexor alternately coupling one of said first programmable logic core and said second programmable logic core to said memory.

8. The integrated circuit of claim 1 further comprising:

a third programmable logic core having a configuration interface coupled to said common interface bus system and having a control interface coupled to said common interface bus system, and a fourth programmable logic core having a configuration interface coupled to said common interface bus system and having a control interface coupled to said common interface bus system, whereby said digital signal processor may control operation of one of said third and fourth programmable logic cores while it configures the other of said third and fourth programmable logic cores.

9. A method for operating an integrated circuit having a digital signal processor, first and second programmable logic cores and a direct memory access device adapted for configuring said programmable logic cores comprising:

processing data with said digital signal processor and said first progammable logic core while using said direct memory access device to reconflaure said second programmable logic core.

10. A method for operating an integrated circuit having a digital signal processor comprising a processing core and memory and having first and second programmable logic cores comprising:

using a memory sharing unit to couple data between said first and second programmable logic cores and said memory;

using a common interface bus system to couple control and configuration signals between said digital signal processor and said first and second programmable logic cores; and using said digital signal processor, said memory sharing unit and said first programmable logic core to process data while using said common interface bus system to reconfigure said second programmable logic core.

11. The method of claim 10, further comprising using said digital signal processor, said memory sharing unit and said second programmable logic core to process data while using said common interface bus system to reconfigure said first programmable logic core.

12. The method of claim 10, wherein said common interface bus system is an Advanced Microcontroller Bus Architecture Advanced High-performance Bus.

13. The method of claim wherein said common interface bus system comprises a control bus and a configuration bus and said programmable logic cores each have a control interface coupled to the control bus and a configuration interface coupled to the configuration bus, further comprising using a direct memory access device adapted for configuring programmable logic cores to reconfigure said second programmable logic core.

14. A method for operating an integrated circuit having a digital signal processor comprising a processing core and memory and having first, second, third and fourth programmable logic cores comprising:

using a memory sharing unit to couple data between said first, second, third and fourth programmable logic cores and said memory;

using a common interface bus system to couple control and configuration signals between said digital signal processor and said first, second, third and fourth programmable logic cores; and using said digital signal processor, said memory sharing unit and said first and second programmable logic cores to process data while using said common interface bus system to reconfigure said third and fourth programmable logic cores.

15. The method of claim 14, further comprising using said digital signal processor, said memory sharing unit and said third and fourth programmable logic cores to process data while using said common interface bus system to reconfigure said first and second programmable logic cores.

16. The method of claim 14, wherein:

said first programmable logic core is used for preprocessing data and said second programmable logic core is used for postprocessing data; and said third programmable logic core is reconfigured for preprocessing and said fourth programmable logic core is reconfigured for postprocessing.

17. The method of claim wherein said common interface bus system is Advanced Microcontroller Bus Architecture Advanced High-performance Bus.

18. The method of claim 14 wherein said common interface bus system comprises a control bus and a configuration bus and said programmable logic cores each have a control interface coupled to the control bus and a configuration interface coupled to the configuration bus, further comprising using a direct memory access device adapted for configuring programmable logic cores to reconfigure said third and fourth programmable logic cores.

19. An integrated circuit comprising:

an AMBA AHB bus, a digital signal processor having an internal memory and a port coupled to said AMBA AHB bus, a first programmable logic unit having a data port coupled to said digital signal processor internal memory, a configuration port coupled to said AMBA AHB bus and a control port coupled to said AMBA AHB bus, and a second programmable logic unit having a data port coupled to said digital signal processor internal memory, a configuration port coupled to said AMBA AHB bus and a control port coupled to said AMBA AHB bus;

whereby said digital signal processor may process data with one of said first and second programmable logic units while reconfiguring the other of said first and second programmable logic units.

20. The integrated circuit 19, further comprising a memory sharing unit coupling the data ports of said first and second programmable logic units to said digital signal processor internal memory.

* * * * *